Figure 1:
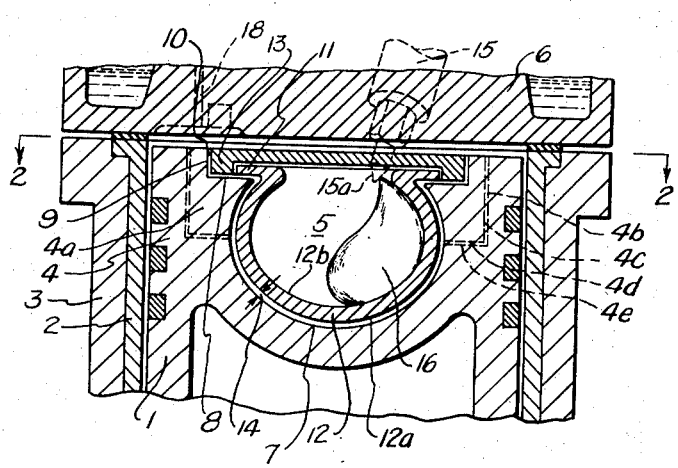

Dec. 23, 1958

J. LIEBEL 2,865,346

INTERNAL COMBUSTION ENGINE

Filed Sept. 4, 1956

INVENTOR

*Julius Liebel*

BY

*Bailey, Stephens & Huettig*

ATTORNEYS

União dos Estados Unidos Escritório de Patentes 2,865,346
Patented Dec. 23, 1958

2,865,346

INTERNAL COMBUSTION ENGINE

Julius Liebel, Nurnberg, Germany, assignor to Maschinenfabrik Augsburg-Nurnberg A. G., Nurnberg, Germany Application September 4, 1956, Serial No. 607,909

Claims priority, application Germany September 13, 1955

10 Claims. (Cl. 123—32)

This invention relates to a device for automatic regulation of the dissipation of the heat generated in the combustion chamber of internal combustion engines, using in per se known manner a lining separated from the wall of the combustion chamber by an air gap which exists only in cold condition of the engine, i. e. in the starting phase thereof, while being bridged in operation by the thermal expansion occurring as the parts are heated.

It is an object of the invention to improve the means already proposed for carrying out this idea, more particularly with a view to its application in self-igniting internal combustion engines having a combustion chamber which is shaped similar to a hollow generated by rotation of a curved line and formed by a recess in the piston or cylinder head, and comprising means for depositing the fuel on the wall of the combustion chamber in the form of a film, gradually releasing it from the wall in vapor form by the combustion air passed over the wetted wall surface of the combustion chamber at a high velocity, mixing it with the air and burning the combustion mixture. With engines of this type it is of particular importance to control the temperature of the wall of the combustion chamber.

A diesel engine is already known in which a metal lining coating the combustion chamber is inserted in a combustion chamber which is openly connected with the stroke chamber and reduced in diameter in relation to the same, in such a way that it is permanently spaced from the wall of the combustion chamber by a small air gap. This arrangement was intended to prevent the free dissipation of heat from the charge circulating in the combustion chamber into the wall thereof and through this wall. However, the known arrangement has the disadvantage that it does not allow for all conditions of operation of the engine; only an accumulation of the heat in the combustion chamber is achieved, but the requirement for cooling of the combustion chamber wall which is just as important, is neglected.

Furthermore, it has been suggested already in hot bulb engines to provide an air gap between a water-cooled section of the wall surrounding the hot bulb and the surface of the hot bulb in the cold condition of the latter, which air gap on heating of the hot bulb is reduced or completely bridged, whereby it is intended to improve the passage of heat from the hot bulb to the water-cooled wall. However, with this known arrangement the part to be cooled, i. e. the hot bulb itself, must undergo considerable deformations by heat elongations which is innoxious with a hot bulb, but in case of combustion chambers of internal combustion engines can be accomplished only difficultly and with particularly complicated means and even then only incompletely.

In another construction already proposed, special expansion bodies are provided outside of the wall of the combustion chamber to be cooled, in the form of heat-dissipating rods or sleeve-shaped heat-dissipating bodies which on heating establish a thermal connection between the wall of the combustion chamber to be cooled on the one hand and a cooling jacket or heat radiating surface on the other hand. Apart from its very complicated and expensive construction, this arrangement has the disadvantage that no means are provided for avoiding metallic fusions of the heat dissipating parts with the wall of the combustion chamber in case of higher temperatures, whereby the intended effect is jeopardized.

It is an object of the invention, therefore, to provide a simplified construction of the combustion chamber basing on the provision of an air gap on the wall of the combustion chamber in which the said disadvantages are avoided and which is especially adapted to the principle of depositing the fuel on the wall according to the above mentioned novel method of injection of the fuel and formation of the mixture.

This problem is solved according to the invention in such a way that a per se known wall lining is inserted in the combustion chamber which lining in a cold condition is spaced by an air gap from the wall of the combustion chamber, while in case of heating the air gap owing to the thermal expansion of the lining is reduced to zero, said lining moreover being treated in such a way, on the side of the air gap, that it does not enter into any metallic union with the wall of the combustion chamber as it engages the same in a hot condition, i. e. as the air gap between the wall lining and the wall of the combustion chamber is bridged by the thermal expansion.

The preparatory treatment may be effected by suitable known processes, for instance by sulphating, phosphating (bonderizing) or the like, which processes as such are not part of the invention and therefore need not be described in detail. By the method according to the invention there is provided an automatic regulating device for retaining and dissipating the heat on the wall of the combustion chamber, which device is no longer subject to any mechanical failures. This is of a considerable importance in case of self-igniting internal combustion engines with wall deposition of the fuel in the combustion chamber, in so far as in this case with excessive heating of the wall of the combustion chamber the fuel would show a higher tendency of being subject to chemical decomposition than in engines operating with air distribution of the fuel. By the method according to the invention, moreover, favorable conditions for starting with cold engine are also provided.

The wall lining of the combustion chamber according to the invention may be a per se known metal lining with relatively thin walls. The wall lining of the combustion chamber according to a further feature of the invention may also be provided in such a way, however, that it is at least partly provided, on the injection side, with an insert consisting of porous material, for instance sintered material, while on the side of the air gap it is purely metallic and treated so as to prevent any metallic union or cold welding. A sintered insert in the combustion chamber has also been proposed already in connection with the wall deposition of the fuel, however in such a manner that the layer of sintered material forms an integral part of the combustion chamber. This is intended to increase the vaporizing process in the combustion chamber by the fact that the sintered material absorbs in a sponge-like manner a part of the fuel injected onto the wall of the combustion chamber, under action of the compression pressure, and in the course of the vaporization gradually yields the same. If such a coating of sintered material is provided as an insert on a special wall lining of the combustion chamber in accordance with the present invention, this porous insert will be particularly effective since its porosity in a cold condition can be kept so that a relatively small amount of fuel is accumulated, while in a hot condition, owing to the special extension of the wall lining the coating of sintered material is loosened in its granulated structure not only thermally, but also mechanically, so that a particularly effective accumulation of fuel and thus a correspondingly thorough evaporation and mixing process is achieved. Also, the provision of the porous coating will be greatly facilitated if it is provided on a separate sleeve or other insert.

Other and further objects, features and advantages of the invention will be pointed out hereinafter and appear in the appended claims forming part of the application.

In the accompanying drawings two now preferred embodiments of the invention are shown by way of illustration and not by way of limitation.

Figure 2:
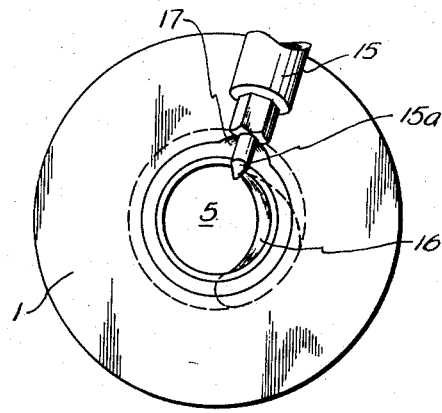
Figure 3:
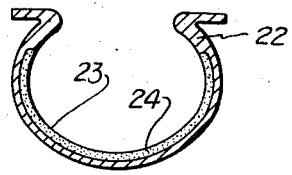

Fig. 1 is an axial section through the upper part of a self-igniting internal combustion engine with a combustion chamber arranged in the piston and provided with a lining in accordance with the invention, Fig. 2 is a plan view thereof on line II—II in Fig. 1, Fig. 3 is an axial section of a wall lining provided with sintered material, including the fixing member for the lining.

Similar reference numerals denote similar parts in the different views.

Referring now to the drawings in greater detail and first to Figs. 1 and 2, it will be seen that a piston 1 is arranged to reciprocate in a cylinder 3 provided with a cylinder liner 2, and formed with a combustion chamber 5 in the piston head 4. The cylinder cover 6 is only partly shown. The combustion chamber 5 is defined by the wall 7 shaped similar to a hollow generated by rotation of a curved line and passing over into an annular wall portion 8 which is displaced inwards of the combustion chamber in relation to the plane of the piston head and in its turn forms with wall 9 a recess 10 in the piston head for insertion of the flanged portion 11 of a preferably metallic wall lining 12. The flange 11 may be held in the recess 10 for instance by an annular member 13 whose outer border surface forms a supplement of the surface of the piston head. In order to facilitate the assembling, advantageously the wall lining 12 with its annular fixing member 13 is arranged in a special insert 4a of the piston head whose accommodation in the piston head 4 is indicated by the seating surfaces 4b—e, indicated in dotted lines, the surfaces 4d, 4e being disposed in the cross sectional plane defined by the maximum diametrical extension of the combustion chamber 5. Hereat, the inner wall of the piston insert 4a forms a part of the inner wall 7 of the combustion chamber.

The wall lining 12 is a metal lining which conforms in shape to the wall 7 of the combustion chamber, being relatively thin and dimensioned in such a way that in cold condition an air gap 14 is formed between the wall 7 of the combustion chamber and the insert which air gap in case of heating of the engine is bridged by expansion of the metal lining and engagement of its surface 12a with the wall 7 of the combustion chamber. The width of the air gap 14 will be 1 mm. in maximum in cold condition. In order that no metallic union shall occur by action of heat in case of contact of the surface 7 with the surface 12a of the lining 12, the latter surface is treated in a suitable manner by per se known processes, such as sulphating, phosphating, bonderizing or the like. Instead of treating the surface 12a of the lining 12, it is also possible to treat the wall 7 of the combustion chamber itself in this way. This, however, will be more difficult in production. The injection of the fuel is indicated by the nozzle 15 and the film of fuel 16 deposited on the inner wall 12b of the lining 12. As shown in Fig. 2 the mouth 15a of the nozzle in the upper dead centre position of the piston 15 is positioned next to the periphery of the transfer passage 17 which in this case is preferably conically shaped and formed by the respective parts of liner 12 and fixing member 13, as seen in Fig. 1. In some cases it may be advantageous to provide a recess 17a in the parts 12 and 13 as indicated in dotted lines in Fig. 2, to receive at least partly the nozzle mouth 15a to position it for reliable deposition of the fuel on the combustion chamber wall. The air is introduced, for instance, through a valve 18 with a deflector 18a, preferably in such a way that it is imparted a rotation about the axis of the cylinder or of the combustion chamber, respectively.

In Fig. 3 there is shown a wall lining 22 provided on the injection side 23 with a coating 24 consisting of a porous material, for instance sintered material. This sintered lining will be provided preferably in the range of the wall of the combustion chamber where wetting thereof with fuel takes place.

The invention is not limited to the embodiment herein illustrated, but may be used wherever the actual shape of the combustion chamber permits, for instance also in combustion chambers arranged in the cylinder head rather than in the piston. The advantage of the invention will be secured not only with internal combustion engines operating with deposition of the fuel on the wall, but quite generally, since in any case the passage of heat on or from the wall of the combustion chamber is automatically regulated with very simple means and without the danger of mechanical disturbances both when starting the engine in cold condition and when operating at full load.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. In an internal combustion engine, the combination of cylinder and piston structures constructed and arranged to provide a recess forming a combustion chamber, means for feeding fuel and air into said combustion chamber and burning it therein, and automatic regulating means for the transfer of heat from said combustion chamber in dependence upon the thermal conditions of the latter, with said regulating means being composed of a liner for said combustion chamber of similar shape but smaller diameter than said recess and inserted with such a distance from the wall of said recess that only a small air gap is maintained between the recess wall and the outer surface of the liner, the improvement comprising a liner consisting of a material of such heat-expansion capacity that it expands outwardly during running of the engine until the air gap is reduced to zero, and provided on its outer surface with a modified surface layer having a chemical consistency for preventing said outer liner surface from sticking to the wall of said recess in an expanded condition of the liner.

2. In an internal combustion engine of the liquid fuel injection compression ignition type, the combination of cylinder and piston structures constructed and arranged to provide a recess forming a combustion chamber, said recess being in the shape of a hollow generated by rotation of a curved line, automatic regulating means for the transfer of heat from said combustion chamber in dependence upon the thermal conditions of the latter, with said regulating means being composed consisting of a liner for said combustion chamber of similar shape but smaller diameter than said recess and inserted with such a distance from the wall of said recess that only a small air gap is maintained between the recess wall and the outer surface of the liner, means for depositing the fuel on the inner surface of the liner in the form of a thin film, and means for passing the combustion air with a high velocity over the film during the compression stroke in such a way that the fuel is gradually released from said surface in the form of vapor, mixed with the air and burnt, the improvement comprising a liner consisting of a material of such heat-expansion capacity that it expands outwardly during running of the engine until the air gap is reduced to zero, and provided on its outer surface with a modified surface layer having a chemical consistency for preventing said outer liner surface from sticking to the wall of said recess in an expanded condition of the liner.

3. An internal combustion engine as in claim 1, said layer on the outer surface of the liner comprising a layer of ferric phosphate material.

4. An internal combustion engine as in claim 1, said layer on the outer surface of the liner comprising a layer of ferrous sulphate material.

5. An internal combustion engine as in claim 1, said layer on the outer surface of the liner comprising a layer of graphite.

6. An internal combustion engine as in claim 1, said layer on the outer surface of the liner comprising a layer of oxide.

7. An internal combustion engine as in claim 1, said liner consisting of a relatively thin layer of heat-resistant metal.

8. An internal combustion engine as in claim 1, the inner surface of the liner exposed to the fuel spray being at least partly provided with a coating of a porous material, and said layer on the outer surface facing the wall of the combustion chamber being purely metallic and treated against metallic union with said wall.

9. An internal combustion engine as in claim 1, the inner surface of the liner exposed to the fuel spray being at least partly provided with a coating of a porous sintered material, and said layer on the outer surface facing the wall of the combustion chamber being purely metallic and treated against metallic union with said wall.

10. In an internal combustion engine having cylinder and piston structures constructed and arranged to provide a recess forming a combustion chamber, a liner for said combustion chamber, which liner is adapted to maintain an air gap between its outer surface and the wall of the combustion chamber in the cold condition of the engine and to expand in operation of the engine to such an extent that the air gap is reduced to zero, said wall of the combustion chamber having a modified surface layer such that a metallic union between said wall and the outer surface of the liner in an expanded condition of the liner is prevented.

References Cited in the file of this patent
UNITED STATES PATENTS
1,500,464    Morrison _____ July 8, 1924
FOREIGN PATENTS
357,586    Great Britain _____ Sept. 24, 1931